United States Patent
Zhang et al.

(10) Patent No.: US 12,452,635 B2
(45) Date of Patent: Oct. 21, 2025

(54) COMMUNICATION SYSTEM AND METHOD FOR ELEVATOR SYSTEM

(71) Applicant: Otis Elevator Company, Farmington, CT (US)

(72) Inventors: Yu Zhang, Shanghai (CN); Fu Qi, Shanghai (CN); Shenhong Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 499 days.

(21) Appl. No.: 17/830,489

(22) Filed: Jun. 2, 2022

(65) Prior Publication Data

US 2023/0134516 A1     May 4, 2023

(30) Foreign Application Priority Data

Nov. 3, 2021 (CN) .......................... 202111293761.7

(51) Int. Cl.
*H04W 4/33* (2018.01)
*H04W 76/10* (2018.01)

(52) U.S. Cl.
CPC ............. *H04W 4/33* (2018.02); *H04W 76/10* (2018.02)

(58) Field of Classification Search
CPC ............................... H04W 76/10; H04L 12/28
USPC .................................................. 370/329, 400
See application file for complete search history.

(56) References Cited

U.S. PATENT DOCUMENTS

| | | |
|---|---|---|
| 6,446,761 B1 | 9/2002 | Motoyama et al. |
| 9,856,108 B2 | 1/2018 | Kusserow |
| 2003/0047390 A1 | 3/2003 | Crenella et al. |
| 2006/0108181 A1 | 5/2006 | Bacellar et al. |
| 2007/0041352 A1 | 2/2007 | Frankel et al. |

(Continued)

FOREIGN PATENT DOCUMENTS

| | | |
|---|---|---|
| CN | 101795480 A | 8/2010 |
| CN | 102158929 A | 8/2011 |

(Continued)

OTHER PUBLICATIONS

European Search Report for Application No. 22205151.8, Issued May 24, 2023, 8 Pages.

*Primary Examiner* — Dang T Ton
(74) *Attorney, Agent, or Firm* — CANTOR COLBURN LLP

(57) ABSTRACT

A communication system for an elevator system, a communication method for an elevator calling system, and a computer-readable storage medium for implementing the method. A communication system includes at least two communication node groups, each of the communication node groups comprising wireless modules deployed at a plurality of locations of the elevator system, one of the wireless modules in each of the communication node groups is set as the first node and the other wireless modules are set as the second node; a master node, which can be configured to establish a communication connection with one of the first nodes as designed, the first node in each of the communication node groups can be configured to establish a wireless communication connection with the second node belonging to the same communication node group and establish a wireless communication connection with the first node in the adjacent communication node group.

20 Claims, 3 Drawing Sheets

(56) References Cited

U.S. PATENT DOCUMENTS

2020/0385234 A1 12/2020 Wei et al.
2023/0281527 A1* 9/2023 Cella ..................... G06V 20/17
                                                      705/7.17

FOREIGN PATENT DOCUMENTS

| | | |
|---|---|---|
| CN | 102497440 A | 6/2012 |
| CN | 104159258 A | 11/2014 |
| CN | 104301965 A | 1/2015 |
| CN | 105430736 A | 3/2016 |
| CN | 105744584 A | 7/2016 |
| CN | 111031585 A | 4/2020 |
| JP | 4653974 B2 | 3/2011 |
| KR | 100789910 B1 | 8/2002 |
| KR | 20120104867 A | 9/2012 |
| WO | 2016072838 A1 | 5/2016 |

* cited by examiner

COMMUNICATION SYSTEM AND METHOD FOR ELEVATOR SYSTEM

FOREIGN PRIORITY

This application claims priority to Chinese Patent Application No. 202111293761.7, filed Nov. 3, 2021, and all the benefits accruing therefrom under 35 U.S.C. § 119, the contents of which in its entirety are herein incorporated by reference.

TECHNICAL FIELD

The present application relates to elevator technology, and in particular, to a communication system for an elevator system, a communication method for an elevator calling system, and a computer-readable storage medium for implementing the method.

BACKGROUND

In an elevator calling system, wireless modules are deployed at each floor to perform the elevator calling operation associated with the respective corresponding floor. Typically, wireless communication modules of the wireless modules on each floor are deployed along an elevator hoistway, and each wireless module or wireless communication modules as a node can establish a wireless communication connection with the wireless module or wireless communication modules of the adjacent floor. Through this cascade connection, the communication between a main controller unit or an elevator control cabinet and any wireless module or the communication between any pair of wireless modules can be realized. Usually, the signal will have a delay of about tens of milliseconds when it is forwarded through several nodes, so when a signal transmission path is long, the accumulated delay will become considerable. Taking a 100-storey high-rise building as an example, when the signal is transmitted from the top floor to the bottom floor, the delay will exceed 1 second. For the elevator calling system, such a high delay level is unacceptable.

SUMMARY

According to one aspect of the present application, there is provided a communication system for an elevator system, comprising:
  at least two communication node groups, each of the communication node groups comprising wireless modules deployed at a plurality of locations of the elevator system, wherein one of the wireless module in each of the communication node groups is set as a first node and the other wireless modules are set as second nodes;
  a master node, which can be configured to establish a communication connection with the first node in one of the communication node groups as a designated first node, wherein the first node in each of the communication node group can be configured to establish a wireless communication connection with the second nodes belonging to the same communication node group and establish a wireless communication connection with the first nodes in its adjacent communication node group, so as to realize communication between the master node and the wireless modules in anyone of the communication node group or between a pair of the wireless modules.

Optionally, in the above communication system, the nodes are used as communication interfaces of a main controller unit, the communication node groups are deployed in different floor groups, and the wireless modules in each of the communication node group are used as communication interfaces of an outbound call control unit and are deployed in each floor of the corresponding floor groups, and the first node is deployed on the start floor or the end floor of the corresponding floor groups.

Optionally, in the above communication system, the designated first node is the first node that is closest in space to the master node.

In addition to the above-mentioned one or more features, in the above communication system, in the same communication node group, the first node and the second nodes establish a communication connection in a cascade manner.

In addition to the above-mentioned one or more features, in the above communication system, in the same communication node group, the first node and the second nodes use a star network structure to establish a communication connection, and the first node is a central node of the star network structure.

In addition to the above-mentioned one or more features, in the above communication system, the master node can also be configured to modify settings of the first node and the second nodes associated with an event having a predefined type in response to the event having a predefined type. In the above communication system, the event having a predefined type comprises a failure of a currently set first node or a modification of setting of a first node in an adjacent communication node group.

In addition to the above-mentioned one or more features, in the above communication system, the communication node group is set based on at least one of the following: delay constraints in signal transmission and an effective communication distance of the first node and the second nodes.

In addition to the above-mentioned one or more features, in the above communication system, an establishment of the wireless communication connection is based on one of the following: Wi-Fi communication technology, Bluetooth communication technology, Zigbee communication technology.

According to another aspect of the present application, there is provided an elevator control system comprising an elevator calling system having the various features described above.

According to another aspect of the present application, there is provided a communication method for an elevator calling system, comprising the following steps:
  dividing wireless modules into at least two communication node groups, wherein the wireless modules in each of the communication node group are deployed at a plurality of locations of the elevator system;
  in each of the communication node group, one of the wireless module is set as the first node and the other wireless modules are set as the second node;
  configuring a master node to establish a communication connection with the first node in one of the communication node groups as a designated first node; and
  configuring the first node in each of the communication node group to be able to establish a wireless communication connection with the second nodes belonging to the same communication node group and establish a wireless communication connection with the first node in its adjacent communication node group, so as to realize communication between the master node and the wireless modules in anyone of the communication node groups or between a pair of the wireless modules.

Optionally, the above method further comprises the following steps:

in response to an event having a predefined type, settings of the first node and the second nodes associated with the event having a predefined type are modified by the master node.

According to another aspect of the present application, there is provided a computer-readable storage medium having instructions stored in the computer-readable storage medium, when the instructions are executed by a processor, the processor is caused to execute the above method.

DESCRIPTION OF THE DRAWINGS

The above and/or other aspects and advantages of the present application will be more clearly and easily understood from the following description of various aspects in conjunction with the accompanying drawings, in which the same or similar elements are designated by the same reference numerals. The accompanying drawings include.

DETAILED DESCRIPTION

The present application is described more fully below with reference to the accompanying drawings, in which illustrative embodiments of the application are illustrated. However, the present application may be implemented in different forms and should not be construed as limited to the embodiments presented herein. The presented embodiments are intended to make the disclosure herein comprehensive and complete, so as to more comprehensively convey the protection scope of the application to those skilled in the art.

In this specification, terms such as "comprising" and "including" mean that in addition to units and steps that are directly and clearly stated in the specification and claims, the technical solution of this application does not exclude the presence of other units and steps that are not directly and clearly stated in the specification and claims.

Unless otherwise specified, terms such as "first" and "second" do not indicate the order of the units in terms of time, space, size, etc., but are merely used to distinguish the units.

In this specification, terms such as "direct communication connection" should be understood as a situation where communication signals are transmitted directly between two units. In this specification, terms such as "communication connection" and "direct communication connection" are used interchangeably unless otherwise specified.

Figure 1:
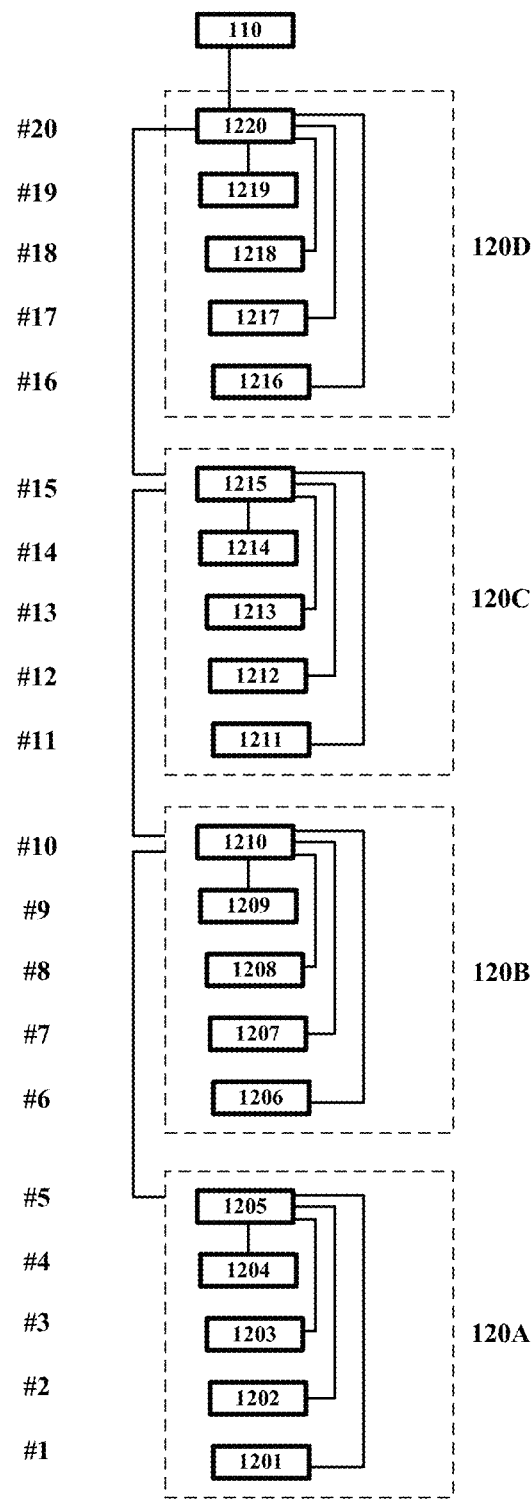
FIG. 1 is a schematic block diagram of a communication system for an elevator system according to some embodiments of the present application.

FIG. 1 is a schematic block diagram of a communication system for an elevator system according to some embodiments of the present application.

Referring to FIG. 1, the illustrated communication system 10 includes a master node 110 and wireless modules 1201-1220 (in the following description, the terms "wireless module" and "node" are used interchangeably). In FIG. 1, the direct communication connection between the two is represented by a solid line connecting the units. The master node 110 and the wireless modules 1201-1220 may be implemented using processor-based devices, such as microprocessor devices executing software to perform the operations described herein.

Exemplarily, the master node for example can be used as a communication interface of a main controller unit or an elevator control cabinet, and the wireless module for example can be used as a communication interface of an outbound call control unit.

Exemplarily, the wireless modules 1201-1220 are deployed in floors #1-#20, respectively, to perform calling operations associated with the respective corresponding floors (for example, receiving a user's call request for an elevator, displaying the current floor of the elevator, and presenting a prompt message when the elevator arrives at the calling floor, etc.). In one example, the wireless module of the outbound call control unit can be arranged in the elevator hoistway, and a control module is integrated with a display module and disposed near the elevator entrance on each floor. In the following description, unless otherwise specified, the outbound call control unit and the wireless module of the outbound call control unit can be used interchangeably.

As shown in FIG. 1, floors #1-#20 are divided into 4 floor groups #A-#D, and each floor group contains 5 floors. It should be pointed out that the division method of dividing the floors into 4 groups as shown in FIG. 1 is only an example, and the floors can be divided in an uneven manner according to the actual application, and the number of groups is not limited to a specific value.

The wireless modules may be correspondingly divided into a plurality of communication node groups corresponding to the floor groups. In the example shown in FIG. 1, the wireless modules 1201-1220 are divided into 4 communication node groups 120A-120D, wherein the wireless modules 1201-1205 belong to the unit group 120A, the wireless modules 1206-1210 belong to the unit group 120B, the wireless modules 1211-1215 belong to unit group 120C, and wireless modules 1216-1220 belong to unit group 120D.

In some embodiments of the present application, for each of the communication node group, one of the wireless modules may be set as the first node (hereinafter also referred to as "lead node") and the other wireless modules may be set as the second node (hereinafter also referred to as "ordinary node"). The main difference between a lead node and an ordinary node is the scope of objects that can establish direct communication connections. Specifically, in each of the communication node group, the lead node and the ordinary node are connected together through a star network structure, wherein the lead node, as the central node of the star network structure, is configured to establish a direct wireless communication connection with each ordinary node in the same communication node group, while the ordinary node can be configured to establish a direct wireless communication connection with only the lead node in the same communication node group; on the other hand, the lead node is also configured to establish a direct wireless communication connection with the lead node in the communication node group of the adjacent floor group. Technologies that can be used to establish a wireless communication connection include, but are not limited to, Wi-Fi communication technology, Bluetooth communication technology, Zigbee communication technology, and the like, for example.

It should be pointed out that, in each of the communication node group, in addition to establishing direct wireless communication connections with the lead node in the same group, ordinary nodes can also establish direct wireless communication connections with one or more other ordinary nodes in the same group.

Taking the example shown in FIG. 1 as an example, the wireless modules 1205, 1210, 1215, and 1220 may be set as lead nodes in the communication node group to which they belong, and other wireless modules in the communication node group may be set as ordinary nodes. Between the communication node groups 120A-120D, the wireless modules 1205, 1210, 1215 and 1220 serving as lead nodes are connected in a cascaded manner, and in each of the communication node group 120A-120D, direct communication connection is established between the lead node and the ordinary nodes.

Although any wireless module in each of the communication node group can be used as a lead node, setting the wireless module at a fixed position in each of the communication node group as the lead node is advantageous for the inter group transmission of signals (i.e., the transmission of signals between different communication node groups). Optionally, the wireless module deployed on the start floor or the end floor of the floor group can be set as the lead node.

As shown in FIG. 1, the master node 110 may establish a direct communication connection with the wireless module 1220, and the communication connection may be wireless or wired. Although the lead node that establishes a communication connection with the master node can be arbitrarily designated, it is generally advantageous to select the one that is spatially closest to the master node because this reduces the communication distance between the two. Taking FIG. 1 as an example, it is assumed that the master node 110 is located on the highest floor #20, so it is reasonable to configure it to establish a communication connection with the lead node 1220.

When the master node sends a signal indicating the elevator running status (such as the current floor of the elevator) to the wireless module as the signal receiver, the signal is first transmitted outside the group (ie, transmitted between the master node and the communication node group and between different communication node groups). Subsequently, when the signal arrives at the lead node in the communication node group to which the receiver belongs, if the receiver is a lead node, the transmission process is completed, otherwise the signal is transmitted in the group (ie, from the lead node to the ordinary node). On the other hand, when the wireless module as the signal sender sends a signal (such as a user's call request, etc.) to the master node, if the wireless module is an ordinary node, the signal is first transmitted to the lead node in the group, and then transmitted to the master node outside the group. If the wireless module is a lead node, the signal is directly transmitted to the master node outside the group.

Communication is also similar for any pair of multiple wireless modules. Specifically, if the pair of wireless modules belongs to the same communication node group, the signal transmission can be completed only in the group. If the pair of wireless modules belong to different communication node groups, transmission outside the group is necessary.

In a typical elevator calling system, the main node and the wireless module are connected together in cascade, so the transmission path of the signal includes all nodes between the sender and the receiver. Although it is possible to reduce the delay when the node forwards the signal by means of improving hardware specifications, etc., this will inevitably increase the manufacturing cost. Compared with the cascading method, the above-mentioned combination of transmission outside the group and transmission in the group can greatly reduce the number of nodes that forward signals at a lower implementation cost, thereby significantly reducing transmission delay. Also, the grouping of the above wireless modules and combination of transmission in the group and transmission outside the group can greatly extend the communication distance and meet the immediacy requirements of long-distance communication. In addition, in case of communication failure, the failed node can be quickly located by checking the communication node group first and then the wireless module in the group.

Usually, the signal transmission effective distance or effective signal coverage of the wireless module in the wireless module cannot extend to the entire floor. Therefore, when dividing floor groups or wireless modules, it is advantageous to take into account the signal coverage of lead nodes and ordinary nodes. In addition, delay constraints (such as the maximum allowable delay time) when the signal travels between floors are also taken into consideration.

Optionally, in some embodiments, the settings of lead node and ordinary nodes in each of the communication node group are dynamically adjustable. In one embodiment, the master node 110 is configured to modify the settings of the lead node and ordinary nodes in one or more communication node groups in response to an event having a predefined type. Optionally, examples of event having a predefined types include, but are not limited to, a failure of a currently set lead node or a modification of setting of a lead node in a communication node group of an adjacent floor group. With the help of the above mechanism of dynamically updating the settings of the lead node, when the lead node is invalidated or fails, the ordinary node in the communication node group can be selected as the new lead node to ensure the data transmission path between the groups, thereby improving the robustness of the system.

Figure 2:
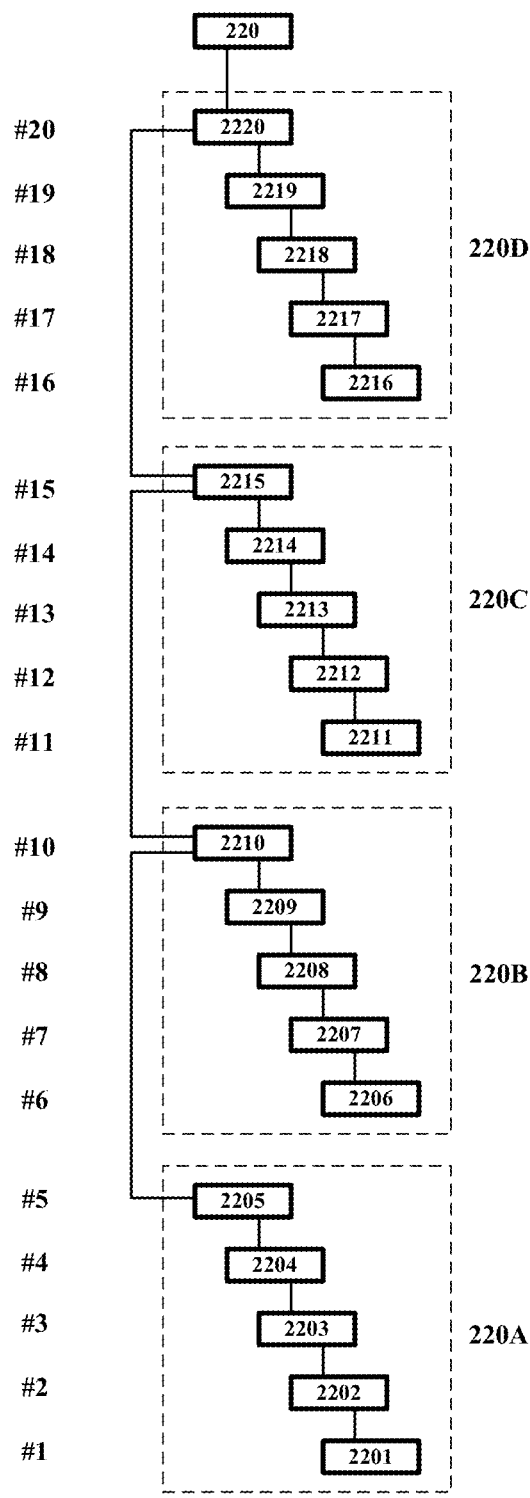
FIG. 2 is a schematic block diagram of a communication system for an elevator system according to other embodiments of the present application.

FIG. 2 is a schematic block diagram of an elevator calling system according to other embodiments of the present application.

Referring to FIG. 2, the elevator calling system 20 shown includes a master node or elevator control cabinet 210 and wireless modules 2201-2220. Likewise, in FIG. 2, the direct communication connection between the two is represented by a solid line connecting the units.

The following mainly describes the differences between the embodiment shown in FIG. 2 and the embodiment shown in FIG. 1.

Referring to FIG. 2, exemplarily, the wireless modules 2205, 2210, 2215 and 2220 are set as lead nodes in the respective communication node groups 220A-220D and other wireless modules in the communication node groups are set as ordinary nodes. Likewise, the master node 210 may establish a direct wireless or wired communication connection with the wireless module 2220.

As shown in FIG. 2, the lead nodes are configured to establish direct wireless communication connections with lead nodes in a communication node group of an adjacent floor group. However, the difference from FIG. 1 is that, in the embodiment shown in FIG. 2, in each of the communication node group 220A-220D, the lead node and the ordinary nodes of the same group are connected together in a cascade manner.

In the embodiment shown in FIG. 2, when the master node sends a signal indicating the elevator running status to the wireless module as the signal receiver, the signal is first transmitted outside the group. Subsequently, when the signal arrives at the lead node in the communication node group to which the receiver belongs, if the receiver is a lead node, the transmission process is completed, otherwise the signal is transmitted to ordinary nodes in a cascaded manner in the group. On the other hand, when the wireless module as the signal sender sends a signal to the master node, if the wireless module is an ordinary node, the signal is first transmitted to the lead node in a cascaded manner in the group, and then transmitted to the master node outside the group. If the wireless module is a lead node, the signal is directly transmitted to the master node outside the group.

Communication is also similar for any pair of multiple wireless modules. For example, if the pair of wireless modules belongs to the same communication node group, the signal transmission only needs to be completed in the group in a cascade way. If the pair of wireless modules belongs to different communication node groups, the signal is transmitted between the communication node groups outside the group.

The above communication method also has various advantages of the embodiment shown in FIG. 1. In addition, when the lead node and the ordinary nodes of the same group are connected together in a cascade manner, the effective transmission distance of signals between nodes can be reduced, thereby reducing power consumption and hardware cost.

In the communication systems shown in FIGS. 1 and 2, each node is implemented by a communication module or a wireless module capable of wireless communication, but this specific implementation is only exemplary, and should not be understood as an essential feature when applying the above embodiments or variations thereof. That is to say, the content disclosed in the application is also applicable to a communication system that implements signal transmission between some nodes in an elevator system through a wired manner (ie, the communication system includes both a wireless module and a wired module). For example, when signal transmission is implemented between some nodes in a wired manner, the wireless module and the wired module may be divided into multiple communication node groups. That is to say, for a communication node group, it may only include wireless modules, or may include both wireless modules and wired modules. By setting the first node and the second node and configuring corresponding functions, the communication between the master node and the wireless modules in any communication node group or the communication between a pair of wireless modules is realized. To this end, the wired modules may be configured to provide wired communication connections over the communication links between the master node and the wireless modules in any communication node group, or over the communication links between a pair of wireless modules. Correspondingly, the wireless connection between the lead node and the ordinary node should be broadly understood to cover all cases of connection through wireless channels and connections through wireless channels and wired channels. Likewise, the wireless connection between ordinary nodes should also be broadly understood to cover all the connection through wireless channels and the connection through wireless channels and wired channels.

Figure 3:
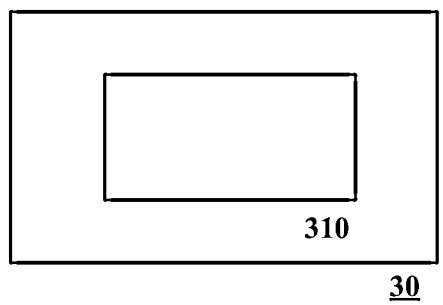
FIG. 3 is a schematic block diagram of an elevator control system according to other embodiments of the present application.

FIG. 3 is a schematic block diagram of an elevator control system according to other embodiments of the present application.

The elevator control system 30 shown in FIG. 3 includes a communication system 310 which may, for example, have various features of the embodiments described above with reference to FIGS. 1 and 2. It should be pointed out that, in order to avoid redundant description, other components in the elevator control system (such as PLC, frequency converter, speed regulation system, etc.) are not shown in FIG. 3.

Figure 4:
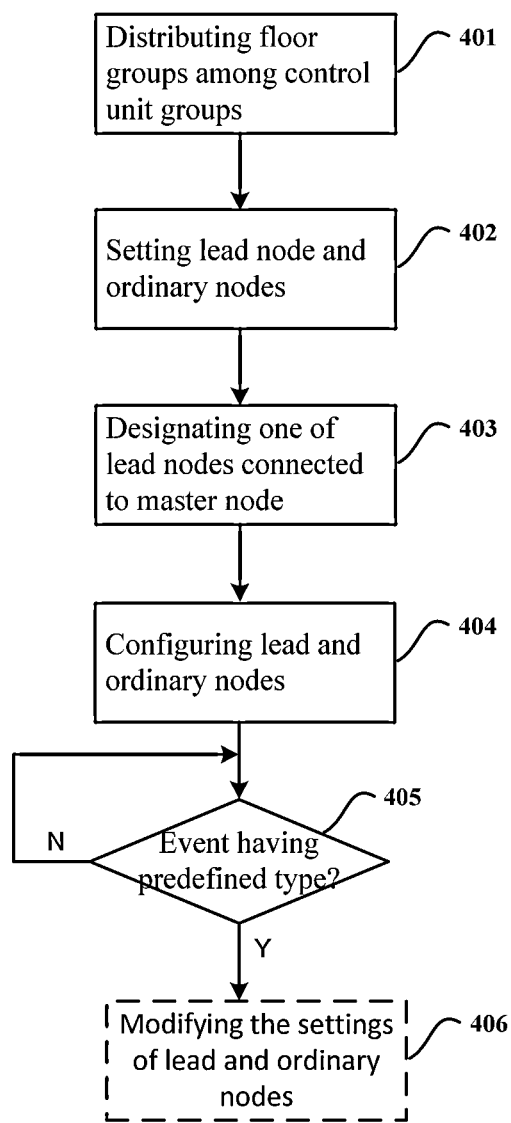
FIG. 4 is a flowchart of a communication method for an elevator system according to other embodiments of the present application.

FIG. 4 is a flowchart of a communication method for an elevator system according to other embodiments of the present application.

Exemplarily but not necessarily, the following description will take the communication system shown in FIG. 1 or 2 as an example. It is not difficult for those skilled in the art to understand that the method shown in FIG. 4 is not limited to the specific example of the communication system described in this specification.

As shown in FIG. 4, a communication method for an elevator system includes the following steps:

Step 401: Divide the wireless modules of the communication system into at least two communication node groups, and each wireless module in the group is deployed at multiple locations in the elevator system (eg, in each floor of the corresponding floor group). Still taking FIG. 1 as an example, floors #1-#20 are divided into 4 floor groups #A-#D, each floor group contains 5 floors; wireless modules 1201-1220 are divided into 4 communication node groups 120A-120D corresponding to floor groups #A-#D respectively, and the wireless modules in each of the communication node group are deployed in the corresponding floor. For example, for communication node group A, wireless modules 1201-1205 are deployed in the floor #1-#5, for other communication node groups B-C, and so on.

Step 402: In each of the communication node group, set one of the wireless modules as a lead node (for example nodes 1205, 1210, 1215 and 1220 in FIG. 1 and nodes 2205, 2210, 2215 and 2220 in FIG. 2) and set other wireless modules as ordinary nodes. The meanings and features of the lead node and the ordinary node have been described above, and will not be repeated here.

Step 403: It designates a lead node among the plurality of lead nodes as a designated node that establishes a direct communication connection with the master node. Optionally, a lead node (for example lead node 1220 in FIG. 1 and lead node 2220 in FIG. 2) that is spatially closest to the master node may be designated as a node for establishing a direct communication connection.

Step 404: Execute the communication configuration for the lead node and the ordinary node in each of the communication node group. Specifically, lead nodes (for example, nodes 1205, 1210, 1215, and 1220 in FIG. 1 and nodes 2205, 2210, 2215, and 2220 in FIG. 2) are configured as follows: it can establish wireless communication connections with ordinary nodes belonging to the same communication node group (such as the direct connection method shown in FIG. 1 and the cascade connection method shown in FIG. 2); it can establish a direct wireless communication connection with the lead node in the communication node group of the adjacent floor group.

Through the configuration, the communication between the master node and the nodes in any communication node group or between any pair of nodes can be realized. When the master node as the sender of the signal sends a signal to the wireless module as the receiver of the signal, the signal is first transmitted outside the group (for example, in FIG. 1 and FIG. 2, transmitted between the master node and the communication node group 120D or 220D and between different communication node groups 120A-120D or 220A-220D). Subsequently, when the signal arrives at the lead node in the communication node group to which the receiver belongs (for example, assumed that is communication node group 120A), if the receiver is a lead node (for example, assume that is node 1205), the transmission process is completed, otherwise the signal is transmitted in the group (ie, transmitted by the lead node 1205 to one of the ordinary nodes 1201-1204). On the other hand, when the wireless module as the signal sender sends a signal to the master node, if the wireless module is an ordinary node (for example, assume that is node 1201 in FIG. 1 or 2207 in FIG. 2), the signal is first transmitted to the lead node (for example, node 1205 in FIG. 1 or 2210 in FIG. 2) in the group, and then transmitted to the master node outside the group (for example, in FIG. 1, it reaches the master node 110 through nodes 1205, 1210, 1215 and 1220, and in FIG. 2, it reaches the master node 210 through nodes 2210, 2205 and 2220). If the wireless module is a lead node (for example, assume that is node 1205), the signal is directly transmitted to the master node outside the group (for example, it reaches the master node 110 through nodes 1205, 1210, 1215 and 1220).

The communication method is similar for any pair of wireless modules among the plurality of wireless modules, not tired in words here.

Optionally, the method shown in FIG. 4 may further comprise the following steps:

Step 405: monitor whether an event having a predefined type occurs, if so, proceed to step 406, otherwise continue to monitor. Exemplarily, examples of event having a predefined types include, but are not limited to, a failure of a currently set lead node or a modification of setting of a lead node in a communication node group of an adjacent floor group.

Step 406: Modify the settings of the lead node and the ordinary node associated with the monitored event having a predefined type. For example, assuming that the lead node 1205 in FIG. 1 fails, in the communication node group 120A, the node 1204 can be set as a lead node and the node 1205 can be set as an ordinary node; for another example, assuming that in the communication node group 120D of FIG. 1, the lead node is changed from the original node 1220 to the node 1216, then in order to reduce the wireless communication distance between the node 1216 and the lead node in the adjacent communication node group 120C, the lead node in the communication node group 120C can be changed to node 1211, correspondingly, the lead nodes in the communication node groups 120B and 120A are changed to nodes 1206 and 1201, respectively.

Optionally, the above method steps may be performed by a master node (for example, master node 110 in FIG. 1 and master node 210 in FIG. 2).

According to another aspect of the present application, there is also provided a computer-readable storage medium on which a computer program is stored. When the program is executed by a processor, one or more steps contained in the method described above with the help of FIG. 4 can be realized.

The computer-readable storage medium referred to in the application includes various types of computer storage media, and may be any available medium that can be accessed by a general-purpose or special-purpose computer. For example, the computer-readable storage medium may include RAM, ROM, EPROM, E2PROM, registers, hard disks, removable disks, CD-ROM or other optical disk storage, magnetic disk storage or other magnetic storage devices, or any other transitory or non-transitory medium that can be used to carry or store a desired program code unit in the form of instructions or data structures and that can be accessed by a general-purpose or special-purpose computer or a general-purpose or special-purpose processor. Disks as used herein usually copy data magnetically, while discs use lasers to optically copy data. The above combination should also be included in the protection scope of the computer-readable storage medium. An exemplary storage medium is coupled to the processor such that the processor can read and write information from and to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

Those skilled in the art will appreciate that the various illustrative logical blocks, modules, circuits, and algorithm steps described herein can be implemented as electronic hardware, computer software, or combinations of both.

To demonstrate this interchangeability of hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in varying ways for the particular application, however, such implementation decisions should not be interpreted as causing a departure from the scope of the present application.

It should be pointed out that although the embodiments shown in FIGS. 1-4 are described by means of an elevator calling application example, this does not mean that the contents disclosed in the application are only applicable to elevator calling application. In fact, the content disclosed in the application is suitable for data transmission in various applications related to elevators. That is, the transmitted data can not only be related to calling operations, but also other types of data (such as elevator diagnostic data, user distress signals, etc.). In addition, the manner of dividing the wireless modules into a plurality of communication node groups corresponding to the floor groups in the above embodiments is merely exemplary, and it is not necessary to divide the wireless modules based on floors. For example, in some applications, the elevator system may require deployment of more than one wireless module in a floor, or may require deployment of wireless modules between floors, in which case wireless modules deployed at different locations in the elevator system may be divided into different communication node groups according to various characteristics (such as aggregation degree, node communication capability and communication assurance priority, etc.).

Although only a few of the specific embodiments of the present application have been described, those skilled in the art will recognize that the present application may be embodied in many other forms without departing from the spirit and scope thereof. Accordingly, the examples and embodiments shown are to be regarded as illustrative and not restrictive, and various modifications may be covered by the application without departing from the spirit and scope of the application as defined by the appended claims.

The embodiments and examples presented herein are provided to best illustrate embodiments in accordance with the present technology and its particular application, and to thereby enable those skilled in the art to make and use the present application. However, those skilled in the art will appreciate that the above description and examples are provided for convenience of illustration and example only. The presented description is not intended to cover every aspect of the application or to limit the application to the precise form disclosed.

What is claimed is:

1. A communication system for an elevator system, characterized in that, comprising:
    at least two communication node groups, each of the communication node group comprising wireless modules deployed at a plurality of locations of the elevator system, wherein one of the wireless module in each of the communication node group is set as a first node and the other wireless modules are set as second nodes;
    a master node, which can be configured to establish a communication connection with the first node in one of the communication node groups as a designated first node,
    wherein the first node in each of the communication node group can be configured to establish a wireless communication connection with the second nodes belonging to the same communication node group and establish a wireless communication connection with the first node in its adjacent communication node group, so as to realize communication between the master node and the wireless modules in anyone of the communication node groups or between a pair of the wireless modules;
    wherein, the nodes are used as communication interfaces of a main controller unit, the communication node groups are deployed in different floor groups, and the wireless modules in each of the communication node group are used as communication interfaces of an outbound call control unit and are deployed in each floor of the corresponding floor groups, and the first node is deployed on the start floor or the end floor of the corresponding floor groups.

2. The communication system of claim 1, wherein, the designated first node is the first node that is closest in space to the master node.

3. The communication system of claim 1, wherein, in the same communication node group, the first node and the second nodes establish a communication connection in a cascade manner.

4. The communication system of claim 1, wherein, in the same communication node group, the first node and the second nodes use a star network structure to establish a communication connection, and the first node is a central node of the star network structure.

5. The communication system of claim 1, wherein the master node can also be configured to modify settings of the first node and the second node associated with an event having a predefined type in response to the event having a predefined type.

6. The communication system of claim 5, wherein, the event having a predefined type comprises a failure of a currently set first node or a modification of setting of a first node in an adjacent communication node group.

7. The communication system of claim 1, wherein, the communication node group is set based on at least one of the following: delay constraints in signal transmission and an effective communication distance of the first node and the second nodes.

8. The communication system of claim 1, wherein, an establishment of the wireless communication connection is based on one of the following: Wi-Fi communication technology, Bluetooth communication technology, Zigbee communication technology.

9. The communication system of claim 1, wherein, one or more of the communication node groups further comprise wired modules deployed at one or more locations of the elevator system that can be configured to provide a wired communication connection over a communication link between the master node and the wireless module in anyone of the communication node group or a communication link between a pair of the wireless modules.

10. An elevator control system comprising the communication system of claim 1.

11. A communication method for an elevator system comprising:
    dividing wireless modules into at least two communication node groups, wherein the wireless modules in each of the communication node group are deployed at a plurality of locations of the elevator system;
    in each of the communication node groups, one of the wireless modules is set as a first node and the other wireless modules are set as second nodes;
    configuring a master node to establish a communication connection with the first node in one of the communication node groups as a designated first node; and
    configuring the first node in each of the communication node groups to be able to establish a wireless communication connection with the second nodes belonging to the same communication node group and establish a wireless communication connection with the first node in its adjacent communication node group, so as to realize communication between the master node and the wireless modules in anyone of the communication node groups or between a pair of the wireless modules;
    wherein, the nodes are used as communication interfaces of a main controller unit, the communication node groups are deployed in different floor groups, and the wireless modules in each of the communication node group are used as communication interfaces of an outbound call control unit and are deployed in each floor of the corresponding floor groups, and the first node is deployed on the start floor or the end floor of the corresponding floor groups.

12. The communication method of claim 11, wherein, the first node that is closest in space to the master node is determined as the designated first node.

13. The communication method of claim 11, wherein, in the same communication node group, the first node and the second nodes are connected together in a cascade manner.

14. The communication method of claim 11, wherein, in the same communication node group, a star network structure is used to connect the first node and the second nodes, and the first node is a central node of the star network structure.

15. The communication method of claim 11, wherein, further comprising the steps of:
    in response to an event having a predefined type, settings of the first node and the second nodes associated with the event having a predefined type are modified by the master node.

16. The communication method of claim 15, wherein, the event having a predefined type comprises a failure of a currently set first node or a modification of setting of a first node in a communication node group of an adjacent floor group.

17. The communication method of claim 11, wherein, the communication node group is set based on at least one of the following: delay constraints in signal transmission and an effective transmission distance of the first node and the second node.

18. The communication method of claim 11, wherein, an establishment of the wireless communication connection is based on one of the following: Wi-Fi communication technology, Bluetooth communication technology, Zigbee communication technology.

19. The communication method of claim 11, wherein, further comprising:
   causing one or more of the communication node groups to further comprise wired modules deployed at one or more locations of the elevator system, and configuring the wired modules to provide a wired communication connection over a communication link between the master node and the wireless module in anyone of the communication node group or a communication link between a pair of the wireless modules.

20. A non-transitory computer-readable storage medium having instructions stored in the computer-readable storage medium, when the instructions are executed by a processor, the processor is caused to execute the method according to claim 11.

\* \* \* \* \*